Oct. 6, 1959 C. F. CAFOLLA 2,907,224
TOOL CARRIAGE FEEDING AND POSITIONING MECHANISM
Filed Sept. 4, 1957
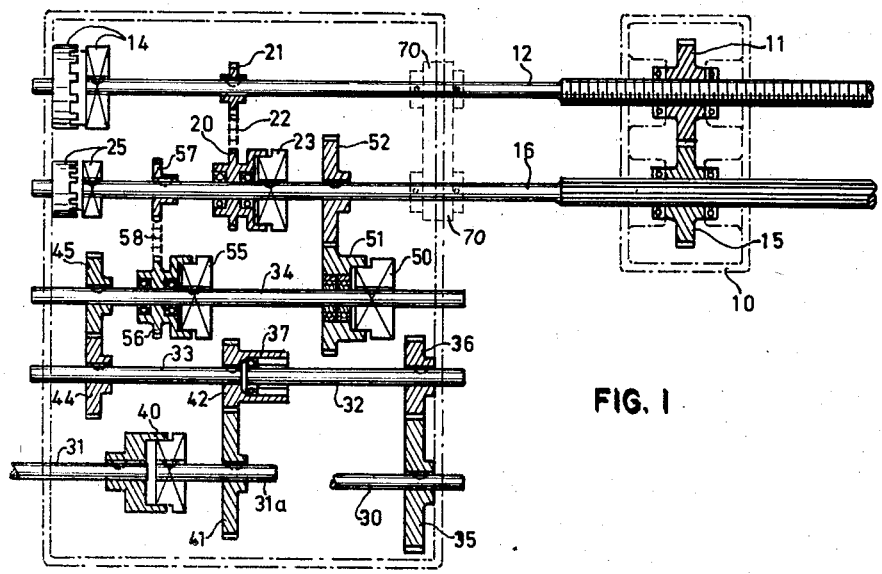
FIG. 1
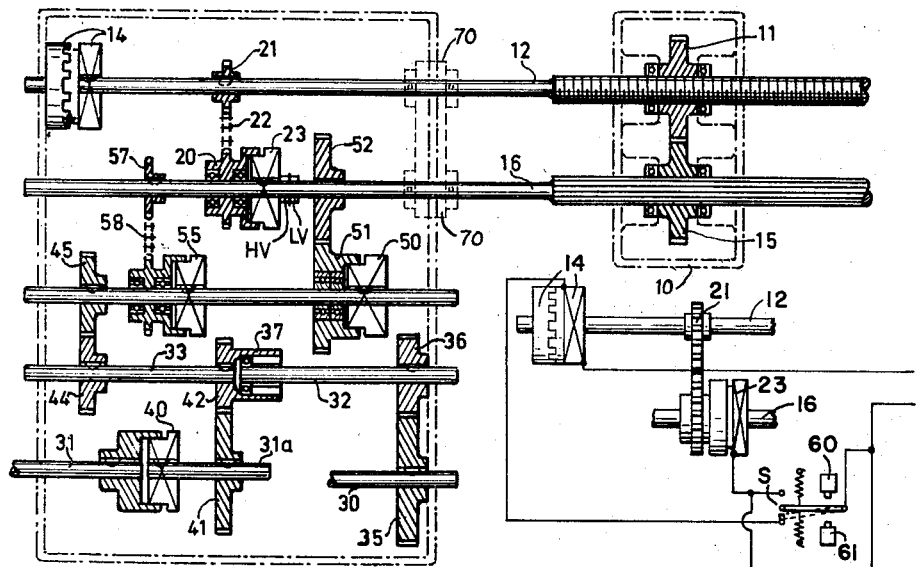
FIG. 2
FIG. 3
INVENTOR.
CONSTANTINE F. CAFOLLA.
BY *Charles T. Hawley*
ATTY.

United States Patent Office 2,907,224
Patented Oct. 6, 1959

2,907,224

TOOL CARRIAGE FEEDING AND POSITIONING MECHANISM

Constantine F. Cafolla, Waterloo, N.Y., assignor to Seneca Falls Machine Company, Seneca Falls, N.Y., a corporation of Massachusetts Application September 4, 1957, Serial No. 682,056

4 Claims. (Cl. 74—424.8)

This invention relates to the axial feeding and predetermined positioning of a tool carriage in a lathe or grinder or in any other similar machine tool.

It is the general object of my invention to provide a primary drive for a tool carriage, such as a lead screw and nut, and to provide a secondary drive at increased speed, which secondary drive is most commonly used for reverse or return operation.

I also provide special control means by which the speed of rotation of the secondary drive may be abruptly reduced or wholly interrupted. By selectively combining the operations of the primary and secondary drives, desired carriage feed operations in both directions may be attained.

A preferred form of the invention is shown in the drawings, in which—

Fig. 1 is a diagrammatic plan view of an effective feeding and control mechanism;

Fig. 2 is a similar view of a slightly modified control mechanism; and

Fig. 3 is a wiring diagram to be described.

Referring to Fig. 1, a tool carriage 10 rotatably supports a gear nut 11 threaded on a lead screw 12. The screw 12 is normally held stationary by an electromagnetic brake 14. The gear nut 11 is revolved by a meshing gear 15, also rotatably supported on the carriage 10. The gear 15 is splined to slide on a rotated shaft 16. Rotation of the shaft 16 and gear 15 rotates the gear nut 11 on the stationary lead screw 12, thereby causing the nut 11 to be moved axially of the lead screw and to move the tool carriage 10 along with it.

Fixed bearings 70 (Figs. 1 and 2) in the support structure of the machine tool, as shown, or other conventional means prevent movement of the shafts 12 and 16 relative to the longitudinal axes of these shafts.

The shaft 16 may be connected to the lead screw 12 through sprockets 20 and 21 and a chain 22. The sprocket 20 may be driven from the shaft 16 through an electromagnetic friction clutch 23.

When the clutch 23 is engaged, the screw 12 will be rotated by the shaft 16 and the gear nut 11 will receive a positive axial movement, thus providing a differential increase in the rate of tool carriage travel. When the clutch 23 is to be engaged, the brake 14 is to be automatically released.

A second electro-magnetic brake 25 (Fig. 1) is provided on the shaft 16 for a purpose to be described, and suitable driving connections are provided for continuously rotating the shaft 16.

Such connections may comprise a continuously rotated low speed shaft 30, a continuously rotated high speed shaft 31, a two-part feed shaft 32—33, and a countershaft 34. The low-speed shaft 30 is connected to the feed shaft part 32 by selected pick-off gears 35 and 36. The feed shaft parts 32 and 33 are connected through an overrunning clutch 37.

The high speed shaft 31 drives an aligned shaft 31a through an electro-magnetic clutch 40, and the shaft 31a is connected to the over-running clutch 37 by gears 41 and 42. The feed shaft part 33 drives the countershaft 34 through gears 44 and 45. The countershaft 34 has a forward drive connection to the splined shaft 16 through an electro-magnetic clutch 50 and meshing gears 51 and 52.

The countershaft 34 also has a reverse connection to the shaft 16 through an electro-magnetic clutch 55, sprockets 56 and 57 and a chain 58.

Illustrative gear and chain drive ratios are shown in Figs. 1 and 2, but these ratios are suggestive only and are not critical. The ratio of sprockets 20 and 21 may be roughly 3 to 2; of gears 44 and 45 may be roughly 1 to 1; of gears 51 and 52 may be 1 to 1; of sprockets 56 and 57 may be roughly 9 to 7; of gears 41 and 42 may be roughly 2 to 1; and gears 35 and 36 may be a little less than 2 to 1, and gears 11 and 15 may be of equal size.

Other suitable ratios may be substituted when found more desirable or usable.

With these connections, the splined shaft 16 is rotated continuously at a selected high speed or a selected low speed and in selected forward or reverse directions, all under the control of the electro-magnetic clutches as described. The tool carriage may thus be selectively fed in either desired direction at relatively high or relatively low speed, and a further differential increase in carriage feed may be achieved by rotating the lead screw 12. This is effected by releasing the brake 14 and engaging the clutch 23. When the clutch 23 is disengaged and the brake 14 applied, rotation of the lead screw 12 is abruptly stopped and the rate of carriage feed is reduced.

The carriage feed may be wholly stopped by disengaging the active countershaft clutch 50 or 55 and applying the brake 25 on the splined shaft 16.

The construction shown in Fig. 2 is closely similar to that shown in Fig. 1, except that the brake 25 on the splined shaft 16 is omitted, and provision is made to supply a selected high or low voltage to the magnetic clutch 23 on the splined shaft 16.

This modified construction permits the lead screw 12 to be rotated for more rapid carriage travel, as previously described, and also provides a de-celerating effect for the carriage by applying the magnetic brake 14 to stop the lead screw 12, and by using the friction clutch 23 at a selected low voltage as a friction drag or brake to retard the rotation of the splined shaft 16.

When the carriage has been slowed down and is to be stopped completely, higher voltage is applied to firmly engage the clutch 23, thus positively gripping the shaft 16 to the stationary lead-screw 12. Whenever this clutch is engaged, wholly or in part, the clutches 50 and 55 for the countershaft 34 should both be disengaged.

Any suitable provision may be made for selective control of the brakes and switches in accordance with tool carriage travel. One such arrangement is shown in the patent to Dinsmore and Smith No. 2,714,324 issued August 2, 1955, and one adaptation of such control devices to applicant's purposes is shown in Fig. 3. The magnetic brake 14 and magnetic clutch 23 are circuit-connected to spaced terminals in a double-pole and double-throw switch S held normally open by spring means shown but not described. The switch S is selectively shiftable to close a circuit by means of magnets 60 or 61.

The magnetic clutch 23 is circuit connected to one pole of a double-pole, double-throw switch S2 and is connected through a resistance R to the other pole of the switch S2.

It can be seen that positioning the switch S to close the circuit to brake 14 will result in the screw shaft 12 being held from rotation. With the circuit through switch S to brake 14 being closed, it will also be apparent that the circuit to clutch 23 through switch S will be open.

Magnets 62 and 63 are provided to selectively position switch S2, respectively, to provide a direct circuit to the clutch 23 or to provide a resistance circuit to the clutch 23 by means of the resistance R.

With the circuit to the brake closed by means of magnet 61, it will be appreciated that positioning of switch S2 to close a circuit either direct to the clutch 23 or through resistance R to the clutch 23, will result in the clutch functioning under heavy friction or under limited friction, respectively. Such alternative functioning of the clutch 23 will stop the shaft 16 quickly or slowly, respectively.

It can further be appreciated that four types of circuitry are provided for the clutch 23 by means of the positioning of the switches S and S2.

Closing of the switch S by means of magnet 60 with switch S2 open will provide direct circuitry for the clutch 23. With switch S open and switch S2 positioned by magnet 62, direct circuitry will also be provided for the clutch 23.

Positioning of switch S by magnet 60 and of switch S2 by magnet 62 will provide parallel circuitry for the clutch 23.

Positioning of switch S2 by magnet 63 and with switch S open will provide resistance circuitry for the clutch 23.

Positioning of switch S by magnet 60 and of switch S2 by magnet 63 will provide shunt circuitry for the clutch 23.

The utility and advantages of this invention will be clearly apparent from the preceding detailed description, when taken in connection with the drawings. The setting up of the different driving combinations may be manually controlled, and the results attained by such combinations have been clearly explained in detail in the foregoing specification.

Having thus described my invention and the advantages thereof, I do not wish to be limited to the details herein disclosed, otherwise than as set forth in the claims, but what I claim is:

1. In a machine tool having a slidable carriage, a lead screw shaft, releasable means holding said lead screw shaft normally against rotation, a drive shaft, means preventing movement of said shafts relative to their respective longitudinal axes, a gear nut element and a gear element rotatably mounted on said carriage but prevented from axial movement thereon, said gear nut element being drivably engaged by said lead screw shaft, said gear element being drivably engaged by said drive shaft but axially movable thereon, said elements being drivably engaged with each other, selective power driven means to rotate said drive shaft in a predetermined direction to effect a change in rate of carriage feed; means to drive said lead screw shaft upon release of said holding means, all of said lead screw drive means and released holding means being effective in cooperation with said selective drive means to provide a differential increase in carriage feed.

2. The subject matter as claimed in claim 1, wherein said releasable means holding said lead screw shaft comprises a releasable brake.

3. The subject matter as claimed in claim 1, wherein the drive shaft has a magnetic friction clutch cooperating with means to provide an operable connection to the lead screw, and wherein a releasable brake is provided, together with means to connect the clutch and the releasable brake simultaneously but reversely to said drive shaft and lead screw.

4. The subject matter as claimed in claim 1, wherein the drive shaft has a magnetic friction clutch cooperating with means to provide an operable connection to the lead screw, and wherein selective control means is provided to effect high or low voltage magnetic control of said friction clutch and to thereby effect selected de-celerating action on said lead screw.

References Cited in the file of this patent
UNITED STATES PATENTS

| | | |
|---|---|---|
| 2,520,014 | Rehnberg et al. | Aug. 22, 1950 |
| 2,756,133 | Butzin | July 24, 1956 |